United States Patent [19]

Tilgner et al.

[11] Patent Number: 4,664,918

[45] Date of Patent: * May 12, 1987

[54] PROCESS FOR REDUCING ALCOHOL IN FERMENTED BEVERAGES BY MEANS OF DIALYSIS

[75] Inventors: Hans G. Tilgner, Mülheim/Ruhr; Franz J. Schmitz, Erlenbach, both of Fed. Rep. of Germany

[73] Assignee: Akzo Nv, Netherlands

[ * ] Notice: The portion of the term of this patent subsequent to Apr. 8, 2003 has been disclaimed.

[21] Appl. No.: 671,812

[22] PCT Filed: Mar. 13, 1981

[86] PCT No.: PCT/DE81/00042

§ 371 Date: Jul. 15, 1981

§ 102(e) Date: Jul. 15, 1981

[87] PCT Pub. No.: WO81/02745

PCT Pub. Date: Oct. 1, 1981

Related U.S. Application Data

[63] Continuation of Ser. No. 498,676, May 3, 1983, abandoned, which is a continuation of Ser. No. 285,124, Jul. 15, 1981, abandoned.

[30] Foreign Application Priority Data

Mar. 14, 1980 [DE] Fed. Rep. of Germany ....... 3009828
Mar. 14, 1980 [DE] Fed. Rep. of Germany ....... 3009829

[51] Int. Cl.$^4$ .............................................. B01D 13/00
[52] U.S. Cl. ..................... 426/14; 210/644; 210/653
[58] Field of Search ............... 210/644, 636, 645, 653; 426/424, 16, 14, 422, 592

[56] References Cited

U.S. PATENT DOCUMENTS

| | | | |
|---|---|---|---|
| 1,390,710 | 9/1921 | Heuser | 426/14 |
| 2,122,761 | 7/1938 | Silhavy | 426/16 |
| 3,228,877 | 1/1966 | Mahon | 210/653 X |
| 3,425,839 | 2/1969 | Pinnegar | 426/16 |
| 3,702,820 | 11/1972 | Hough | 210/644 X |
| 3,956,112 | 5/1976 | Lee et al. | 210/644 |
| 3,974,068 | 8/1976 | Ebner et al. | 210/637 |
| 4,581,236 | 4/1986 | Bandel et al. | 210/650 X |

FOREIGN PATENT DOCUMENTS

| | | |
|---|---|---|
| 21247 | 6/1980 | European Pat. Off. . |
| 0028768 | 5/1981 | European Pat. Off. . |
| 2243800 | 3/1974 | Fed. Rep. of Germany . |
| 1585376 | 1/1970 | France . |
| 2333546 | 1/1977 | France . |
| 1079517 | 8/1967 | United Kingdom . |
| 1177126 | 1/1970 | United Kingdom . |

OTHER PUBLICATIONS

Porter, M. C. et al., "Membrane Ultrafiltration", Chemical Technology, Jan. 1971.
Chemical Abstracts, vol. 92, No. 5, Feb. 1980, (Colombus, Ohio, US) p. 613, abstract 39816v, JP., A, 79119096, 14 Sep. 1979, Yamasa Shoyu., Ltd.
"Membranes in Separations" by Sun-Tak Hwang and Karl Kammermeyer, J. Wiley Interscience (1975), pp. 23-27.
"Membrane in Separation Processes" by Patrick Meares, Elsevier Scientific Publ. Comp. (1976), pp. 537-542.
The New Encyclopaedia Britannica (1982), (a) Micropadia vol. III, p. 519, (b) vol. VII, p. 609; (c) Macropaedia, vol. 4, p. 160, (d) vol. 18, p. 304.
Encyclopedia of Chemical Technology Kirk-Othmer Second Edition 1965 (a) vol. 7, pp. 1-21, (b) vol. 14, pp. 345-356.

*Primary Examiner*—Frank Spear
*Attorney, Agent, or Firm*—Parkhurst & Oliff

[57] ABSTRACT

A dialysis process, wherein a fermented beverage obtained by a customary process is being conducted along one side of the dialysis membrane, with a suitable dialysate fluid containing extract substances (alcohol-free fruit beverage and a fermented beverage from which the alcohol has been removed) flowing on the other side, will simultaneously yield two marketable finished drinks of low alcohol content. To improve the alcohol-reduced beverage, the extract-containing fluid will, in given instances, be conducted in circulation and the alcohol be removed from the dialysate by vacuum distillation.

9 Claims, No Drawings

PROCESS FOR REDUCING ALCOHOL IN FERMENTED BEVERAGES BY MEANS OF DIALYSIS

This application is a continuation of Ser. No. 498,676, filed May 3, 1983, which is a continuation of application Ser. No. 285,124, filed July 15, 1981, both now abandoned.

The invention relates to the production of fermented beverages such as beer, wine, sparkling wine and the like having a reduced alcohol content, wherein a fermented beverage produced by a customary fermentation process is conducted along a dialysis membrane at a pressure differential of less than 0.5 bar, with a dialysate fluid being simultaneously conducted along the other side of the membrane and the dialysate fluid containing extract substances.

For various reasons, attempts have been made since years, to produce fermented beverages such as beer, wine, sparkling wine and the like having a reduced alcohol content. One of the reasons is the maximum limit for the alcohol content in the blood of drivers of motor vehicles, that would make it appear desirable to produce a beverage having a reduced alcohol content. A further important reason is that diabetics can usually obtain fully fermented beverages which, however, due to their alcohol content being higher than that of normally fermented beverages, are not without risks for diabetics.

Beers with reduced alcohol content are thus f.i. being produced in two ways different in principle, i.e. either by selection of the production process, or by subsequent treatment of a full beer produced in the usual manner. These processes had disadvantages until now, particularly as to their taste.

In subsequent treatment of normally fermented beer, the alcohol is withdrawn from the finished beer by
- distillation under atmospheric pressure
- vacuum distillation or
- reverse osmosis.

Furthermore, selective separation of alcohol has been proposed by means of adsorbent resins or cryogenics.

In the attempts to produce other fermented beverages such as wine, fruit wine or sparkling wine having a reduced alcohol content, analogus processes have been used in principle hitherto, such as have become known predominantly for beer.

Closest to the invention comes the separation of alcohol by reverse osmosis. Such reverse osmosis processes are described in the published applications DE No. 21 35 938, DE No. 22 43 800, DE No. 23 23 094, and furthermore DE Nos. 24 09 609 and 24 15 917.

Whilst distillation under atmospheric pressure will, by denaturation of proteins, increasing the content of products of decomposition, and by a whole series of reactions of various ingredients at the increased temperature, not known in detail, result in a product of considerably changed taste, such phenomena may be avoided by the application of vacuum distillation. With some fermented beverages, the danger existed that the—albeit reduced—temperature increase, would still result in a deleterious change of the ingredients. The low-molecular products of decomposition will, in such instances, interfere in the dialysis process and will also diffuse from the dialysate fluid into the product, so that the latter's taste may thereby be impaired.

In the allowed application DE No. 29 24 283, a process is then described how to reduce the alcohol content to the desired extent in a fermented beverage such as beer, wine, sparkling wine and the like, without the taste of the beverage being particularly impaired. Therein, the fermented beverage is conducted along a dialysis membrane at a pressure differential of less than 0.5 bar, whilst at the other side of the dialysis membrane a dialysate fluid is flowing simultaneously,. By pressure differential, the difference in pressure existing between the two sides of the membrane is to be understood. Further utilization of the dialysate fluid has remained a problem therein.

The objective of the present invention was an improved process, wherein the extract substances in the dialysate fluid have an advantageous effect upon the economy of the process and/or the quality of the alcohol-reduced beverages as obtained.

As per invention, this objective is attained by a process wherein a fermented beverage produced by a customary fermentation process, is conducted at a pressure differential of less than 0.5 bar along a dialysis membrane, with a dialysate fluid simultaneously flowing along the other side of the dialysis membrane and the dialysate fluid containing extract substances, characterized by using as dialysate fluid an alcohol-free fruit beverage and/or a fermented beverage from which the alcohol has been removed.

As an alcohol-free fruit beverage in the sense of invention, alcohol-free beverages are to be understood that contain, apart from water, flavoring substances derived from plants.

Vegetable juices as well as cola beverages are also to be understood as alcohol-free fruit beverages in the sense of the invention.

A fermented beverage from which the alcohol has been removed, will contain, in the sense of the invention also, apart from water, flavoring substances derived from plants, when the beverage has been produced by dialysis of a fermented beverage and removing the remaining alcohol by vacuum distillation.

Unsweetened, alcohol-free fruit beverages are preferably used as dialysate fluid. Should a subsequent addition of sugar and/or sweetening substances become necessary, this will ensue pursuant to dialysis.

If a carbon dioxide-containing fermented beverage is to be dialyzed, it has proven to be particularly appropriate to use as dialysate fluid a carbon dioxide-containing alcohol-free fruit beverage or a fermented beverage from which the alcohol has been removed. This will, on one hand, prevent the passing of carbon dioxide through the membrane, and on the other, the dialysate fluid, flowing out of the dialysis, has already become a finished, carbon dioxide-containing, beverage of low alcohol content, that may be bottled without any further treatment. Only the system pressure must be of such magnitude, that escaping of the carbon dioxide will be prevented.

The dialysate fluids as per claim 1, may be recovered in a particular embodiment of the process characterized by the dialysate fluid being conducted in circulation, and by the dialyzed alcohol being separated by vacuum distillation.

The advantages of the process as per invention are thus found in the fact, that in the dialysis of fermented beverages the dialysate fluid is being utilized in a rational manner, either as a marketable finished beverage along with the dialyzed fermented beverage, or as reusable dialysate fluid.

In order to obtain refreshing beverages of reduced alcohol content, an increase may be made in the ratio of dialysate to fermented beverage and/or in the flow rate at both sides.

The taste of the dialysate accruing after dialysis, will have been influenced in a particular manner by substances of the fermented beverage, such as alcohol and extract substances that have diffused in. It is also possible to use, on the dialysate side, the extract substances of the alcohol-free beverage, so that their low-molecular components will influence the taste of the fermented beverage in a particular manner, whereby a product will result different from that obtained by the mixing of two beverages.

If, for instance, dialysis is performed with beer as the fermented beverage and unsweetened lemon juice as the dialysate fluid, the beer will acquire a slightly sour lemon taste, as desired, for instance, in wheat beer, and the dialysate contains, apart from a low alcohol proportion of optionally up to 1.5% by weight of beer, also extract substances, which, by virtue of their bitter substances will give the now weakly alcoholic fruit-juice drink a particular, tart, taste now known before.

A further example is the use of a rasperry drink as dialysate fluid and of beer as the fermented beverage. Apart from alcohol depletion or, respectively, alcohol enrichment, nuances of taste will be available herein that will be reminiscent of the so-called "Berliner weisse".

By reason of the multitude of possible combinations, a multitude of interesting beverages having a low alcohol content may be produced at only a relatively low technical expenditure, with practically no accrual of unusable or worthless residue and with no additional processing being necessary.

It is not only the possibility of utilizing the dialysate fluid that is afforded by the process as per invention, but moreover also the possibility of reducing the multitude of brewing processes, since a number of variations in taste may be produced in this manner from one and the same basic beer.

It has also become possible to produce low-alcohol refreshing beverages with the aid of the process as per invention and to utilize therein such wines that by reason of their low qualities would not be marketable as wines and are, today, only feasible for use in distilleries or in the production of vinegar.

It has been determined that, upon the dialyzing fluid being returned to the dialysis process, the major quantity of the ingredients of fermented beverages, which with vacuum distillation may result in undesirable by-products, will be retained in dialysis.

Using the following example of dialysis of basic wine, it can be demonstrated, that only the alcohol and a portion of the extract substances, and herein only the low-molecular extract substances in particular, will be transferred into the dialysate. When reusing, the dialysate fluid will, after a few passes, practically undergo no further change, and it already contains in adequate concentration all those substances where concern exists about a possible lowering of their concentration in the product.

For dialysis, a dialyzer was applied using as membrane a bundle of cellulosic hollow filament spun from cuprammonium-cellulose solutions. Corresponding dialysis membrane units of hollow filament are well known from hemodialysis. Dialysis membranes from other polymers are equally suitable for the process as per invention.

The exchange area of the hollow-filament membrane unit was 1.3 m$^2$. Flat film or tubular-film membranes may, of course, also be used for the process as per invention. At a temperature of 10° C. and a pressure differential (trans-membrane pressure) of 0.0–0.15 bar, a basic wine for sparkling wine production was conducted through the hollow filament at a rate of 30 l/h.m$^2$, whilst 11.5 l/h.m$^2$ water at the same temperature, was conducted as dialysate fluid over the exterior of the hollow filament.

After passing the dialyzer, the dialysate fluid was subjected to vacuum distillation and subsequently, after making up the volume reduction occurring in distillation (alcohols and water) by adding water, again returned to the circulation of dialysis to serve as dialysate fluid. After passing as dialysate fluid, the alcohol was again removed by vacuum distillation, the volume replenished and again used as dialysate fluid.

The changes in the concentrations are arranged in the following tables 1 and 2.

TABLE 1

| | Changes in concentration of wine during dialysis | | | | | |
|---|---|---|---|---|---|---|
| Number of | Alcohol g/l | | Extract g/l | | Acid g/l | |
| passes | Feed | Drain | Feed | Drain | Feed | Drain |
| 1 | 81,8 | 56,9 | 21,2 | 15,7 | 8,2 | 6,03 |
| 2 | 81,8 | 60,1 | 21,2 | 18,8 | 8,2 | 7,29 |
| 3 | 81,8 | 58,1 | 21,2 | 20,1 | 8,2 | 7,74 |
| 4 | 81,8 | 55,8 | 21,2 | 20,5 | 8,2 | 8,04 |

TABLE 2

| | Changes in concentration of the dialysate fluid during dialysis of wine | | | | | |
|---|---|---|---|---|---|---|
| Number of | Alcohol g/l | | Extract g/l | | Acid g/l | |
| passes | Feed | Drain | Feed | Drain | Feed | Drain |
| 1 | 0 | 58,1 | 0 | 11,6 | 0 | 4,4 |
| 2 | 9,6$^x$ | 63,5 | 11,6 | 17,5 | 4,7 | 6,8 |
| 3 | 6,0$^x$ | 58,7 | 17,5 | 20,3 | 6,6 | 7,8 |
| 4 | 1,6$^x$ | 53,4 | 20,3 | 21,2 | 7,8 | 8,3 |

$^x$Remaining alcohol, contained after vacuum distillation. (Differing values obtained by reason of differing distilling conditions)

The tables show that the concentration in the extract content and the acid content (calculated as tataric acid), will not undergo further change after only four passes, so that subsequent to this pass, dialysis will practically be limited to alcohol only. The possible, but undesirable, accompanying taste stemming from products of decomposition in the dialysate circulation, and caused by using as dialysate fluid a basic wine from which the alcohol had been separated by distillation, was not present in the process as per invention, even after a relatively high number of passes. It is assumed that the substances wherein products of decomposition result in impairments of taste, are not retained by the dialysis membrane, the dialysis membrane however, being impervious to the products of decomposition as such.

This embodiment of the process as per invention is of particular importance to the winery producing sparkling wine, since dialyzed alcohol, which determines the price of basic wine, can be regained to the full extent and be used economically.

We claim:

1. A dialysis process for producing a fermented beverage having a reduced alcohol content, comprising:

(a) producing a fermented beverage of normal ethyl alcohol content, (b) introducing said fermented beverage into a first dialysis chamber, said first chamber being separated from a second dialysis chamber by a dialysis membrane which is substantially permeable to ethyl alcohol, (c) introducing a substantially alcohol-free fruit beverage dialysate liquid into said second chamber, and (d) causing said fermented beverage and said dialysate liquid to flow simultaneously along opposite faces of said dialysis membrane at a pressure differential below 0.5 bar, a portion of the ethyl alcohol content of said fermented beverage passing through said dialysis membrane into said dialysate liquid.

2. The dialysis process of claim 1, wherein said fermented beverage contains an amount of carbon dioxide, and a pressure at which said process is performed is of such magnitude that escape of carbon dioxide is prevented.

3. The dialysis process of claim 2, wherein said dialysate liquid contains an amount of carbon dioxide which corresponds to the amount of carbon dioxide in said fermented beverage to prevent the passing of carbon dioxide through said dialysis membrane.

4. The dialysis process of claim 1, wherein alcohol accumulated in said dialysate liquid is removed in an aftertreatment by vacuum distillation.

5. The dialysis process of claim 1, wherein dialysate liquid from which alcohol has been removed is recirculated into the process.

6. The dialysis process of claim 1, wherein said dialysate liquid is an unsweetened, alcohol-free fruit beverage.

7. The dialysis process of claim 1, wherein said fermented beverage is selected from the group consisting of wine and sparkling wine.

8. The dialysis process of claim 1, wherein said fermented beverage is beer.

9. The dialysis process of claim 8, wherein said dialysate liquid is selected from the group consisting of unsweetened lemon juice and raspberry drink.

* * * * *

UNITED STATES PATENT AND TRADEMARK OFFICE
CERTIFICATE OF CORRECTION

PATENT NO. : 4,664,918

DATED : May 12, 1987

INVENTOR(S) : Hans G. TILGNER et al

It is certified that error appears in the above-identified patent and that said Letters Patent is hereby corrected as shown below:

On the cover page, item [63], change "May 3," to --May 31,--.

Column 2, line 9, change "simultaneously,." to --simultaneously.--.

Column 3, line 25, change "now" to --not--;

line 26, change "rasperry" to --raspberry--.

Signed and Sealed this

Tenth Day of November, 1987

Attest:

DONALD J. QUIGG

Attesting Officer      Commissioner of Patents and Trademarks